United States Patent
Palanisamy et al.

(10) Patent No.: US 10,474,149 B2
(45) Date of Patent: Nov. 12, 2019

(54) AUTONOMOUS BEHAVIOR CONTROL USING POLICY TRIGGERING AND EXECUTION

(71) Applicant: GM Global Technology Operations LLC, Detroit, MI (US)

(72) Inventors: Praveen Palanisamy, Sterling Heights, MI (US); Upali P. Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 29 days.

(21) Appl. No.: 15/680,599

(22) Filed: Aug. 18, 2017

(65) Prior Publication Data
US 2019/0056737 A1    Feb. 21, 2019

(51) Int. Cl.
| G05D 1/00 | (2006.01) |
| G05D 1/02 | (2006.01) |
| G06N 7/08 | (2006.01) |
| B60W 30/00 | (2006.01) |

(52) U.S. Cl.
CPC .......... *G05D 1/0088* (2013.01); *B60W 30/00* (2013.01); *G05D 1/0212* (2013.01); *G06N 7/08* (2013.01); *G05D 2201/0213* (2013.01)

(58) Field of Classification Search
CPC .............. G05D 1/0088; G05D 1/0212; G05D 2201/0213; G06N 7/08
See application file for complete search history.

(56) References Cited

U.S. PATENT DOCUMENTS

| 9,349,285 | B1* | 5/2016 | Fowe | G08G 1/00 |
| 2002/0168017 | A1* | 11/2002 | Berthet | H03M 13/25 |
| | | | | 375/267 |
| 2006/0129771 | A1* | 6/2006 | Dasgupta | G06F 3/0605 |
| | | | | 711/162 |

(Continued)

FOREIGN PATENT DOCUMENTS

JP    2007317165 A  * 12/2007

OTHER PUBLICATIONS

Chen et al.; "DeepDriving: Learning Affordance for Direct Perception in Autonomous Driving", Proceedings of 15th IEEE International Conference on Computer Vision (ICCV2015) Princeton Vision & Robotics, pp. 1-9. URL: <http://deepdriving.cs.princeton.edu>.

(Continued)

*Primary Examiner* — Behrang Badii
*Assistant Examiner* — Daniel L Greene
(74) *Attorney, Agent, or Firm* — Cantor Colburn LLP

(57) ABSTRACT

An autonomous vehicle, a system and method of operating the autonomous vehicle. An environmental sensor obtains one or more parameters of external agents of the vehicle. A processor of the vehicle obtains a route having a destination at the autonomous vehicle, builds a Markov state model of the route that includes a plurality of states for the autonomous vehicle and one or more parameters of the external agents, generates a plurality of driving policies for navigating the route, selects a policy for navigating the route from the plurality of driving policies using a Markov Decision Process, and executes the selected policy at the autonomous vehicle to navigate the vehicle along the route towards the destination.

20 Claims, 9 Drawing Sheets

(56) References Cited

U.S. PATENT DOCUMENTS

| | | | | |
|---|---|---|---|---|
| 2006/0241927 A1* | 10/2006 | Kadambe | ............ | G06K 9/6219 |
| | | | | 703/20 |
| 2010/0318478 A1* | 12/2010 | Yoshiike | ............... | G06N 3/006 |
| | | | | 706/12 |
| 2012/0047103 A1* | 2/2012 | Marecki | ................ | G06Q 10/10 |
| | | | | 706/52 |
| 2014/0244067 A1* | 8/2014 | Filev | ....................... | G06F 17/00 |
| | | | | 701/1 |
| 2014/0302486 A1* | 10/2014 | Seelig | ................. | C21Q 1/6876 |
| | | | | 435/5 |
| 2015/0217736 A1 | 8/2015 | Nomura et al. | | |
| 2015/0282766 A1* | 10/2015 | Cole | ................... | A61B 5/7267 |
| | | | | 702/139 |

OTHER PUBLICATIONS

Musliner et al.; "The Evolution of CIRCA, a Theory-Based AI Architecture with Real-Time Performance Guarantees", Association for the Advancement of Artificial Intelligence (www.aaai.org), 2008, pp. 1-6.

McGann et al.; "T-REX: A Model-Based Architecture for AUV Control", 3rd Workshop on Planning and Plan Execution for Real-World Systems, 2007, Monterey Bay Aquarium Research Institute, Moss Landing, California, pp. 1-7.

\* cited by examiner

AUTONOMOUS BEHAVIOR CONTROL USING POLICY TRIGGERING AND EXECUTION

INTRODUCTION

The subject disclosure relates to a system and method for navigating an autonomous vehicle and, in particular, to a decision-making process for controlling a behavior of an autonomous vehicle to navigate through traffic over a selected route.

Autonomous driving provides the ability to operate a vehicle without input from a driver or passenger other than a providing a destination. The level of processing required for reasoning through unexpected road events in order to make driving decisions is beyond the abilities of scripted rules and predefined knowledge bases. Accordingly, it is desirable to provide a system and method of autonomous driving that exhibits socially acceptable driving behavior.

SUMMARY

In one exemplary embodiment, a method of operating an autonomous vehicle is disclosed. The method includes obtaining a route having a destination at the autonomous vehicle, building a Markov state model of the route including a plurality of states for the autonomous vehicle, generating a plurality of driving policies for navigating the route, wherein each driving policy includes a progression through the plurality of states, selecting a policy for navigating the route from the plurality of driving policies using a Markov Decision Process, and executing the selected policy at the autonomous vehicle to navigate the vehicle along the route towards the destination.

A state of the vehicle is updated as the vehicle navigates the route and an updated policy is determined based on the updated state of the vehicle. An expected reward value is determined for each of the plurality of driving policies, wherein the reward value of a driving policy indicates an effectiveness of the driving policy in advancing the autonomous vehicle towards the destination safely and smoothly, and the policy is selected based on having a selected reward value. In one embodiment, the selected policy further includes the policy having a greatest expected reward value with no penalties. Executing the selected policy at the autonomous vehicle includes performing an action at the vehicle to advance the vehicle towards a destination of the route according to the policy.

A state of the vehicle includes at least one of a pose vector, a kinematics vector, environmental information vector, and an actuator state of the autonomous vehicle. The environmental information vector includes parameters of external agents and traffic regulation devices in the environment.

In another exemplary embodiment, a system for operating an autonomous vehicle is disclosed. The system includes an environmental sensor configured to obtain one or more parameters of external agents of the vehicle and a processor. The processor is configured to obtain a route having a destination at the autonomous vehicle, build a Markov state model of the route that includes a plurality of states for the autonomous vehicle and one or more parameters of the external agents, generate a plurality of driving policies for navigating the route, wherein each driving policy includes a progression through the plurality of states, select a policy for navigating the route from the plurality of driving policies using a Markov Decision Process, and execute the selected policy at the autonomous vehicle to navigate the vehicle along the route towards the destination.

The processor is further configured to update a state of the vehicle as the vehicle navigates the route and determine an updated policy based on the updated state of the vehicle. The processor is further configured to determine an expected reward value for each of the plurality of driving policies, wherein the reward value of a driving policy indicates an effectiveness of the driving policy in advancing the autonomous vehicle towards the destination; and select the policy having a selected reward value. In one embodiment, the selected policy is the policy having a greatest expected reward value with no penalties. In one embodiment, the processor executes the selected policy at the autonomous vehicle by performing an action at the vehicle to advance the autonomous vehicle towards the destination.

A state of the vehicle includes at least one of a pose vector, a kinematics vector, environmental information vector, and an actuator state of the autonomous vehicle. The environmental information vector includes parameters of external agents and traffic regulation devices in the environment.

In yet another exemplary embodiment, an autonomous vehicle is disclosed. The autonomous vehicle includes an environmental sensor configured to obtain one or more parameters of external agents of the vehicle. The processor is configured to obtain a route having a destination at the autonomous vehicle, build a Markov state model of the route that includes a plurality of states for the autonomous vehicle and the one or more parameters of the external agents, generate a plurality of driving policies for navigating the route, wherein each driving policy includes a progression through the plurality of states, select a policy for navigating the route from the plurality of driving policies using a Markov Decision Process, and execute the selected policy at the autonomous vehicle to navigate the vehicle along the route towards the destination.

The processor is further configured to update a state of the vehicle as the vehicle navigates the route and determine an updated policy based on the updated state of the vehicle. The processor is further configured to determine an expected reward value for each of the plurality of driving policies wherein the reward of a driving policy indicates an effectiveness of the driving policy in advancing the autonomous vehicle towards the destination; and select the policy having a selected reward value. In one embodiment, the selected policy is the policy having a greatest expected reward with no penalties.

A state of the vehicle includes at least one of a pose vector, a kinematics vector, environmental information vector, and an actuator state of the autonomous vehicle. The environmental information vector includes parameters of external agents and traffic regulation devices in the environment.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
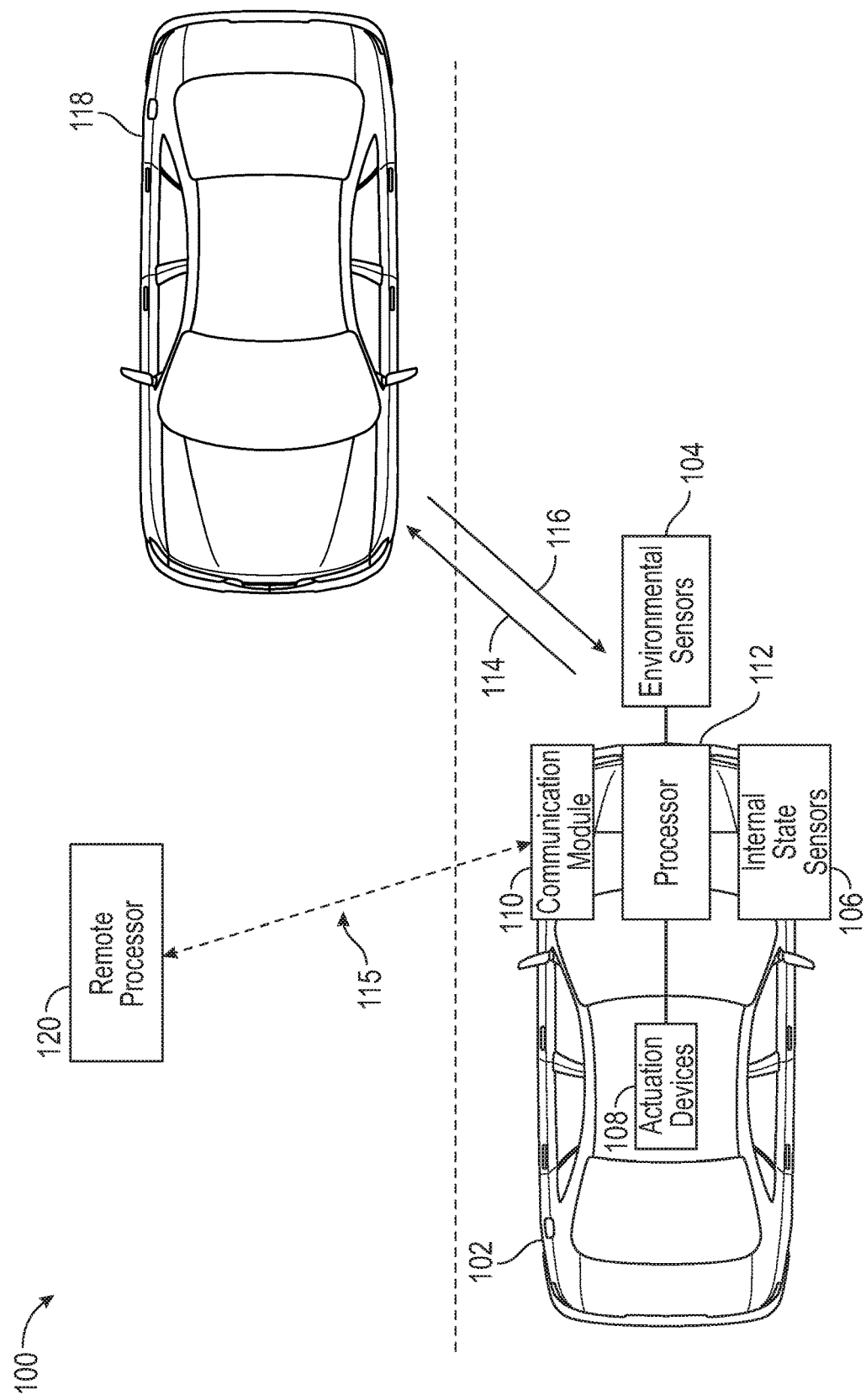
FIG. 1 shows a plan view of a vehicle navigating a route with respect to various external agents in the environment.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the disclosure, FIG. 1 shows a plan view of a vehicle 102 navigating a route with respect to various external agents 118 in the environment 100. In one embodiment, the vehicle 102 is an autonomous or self-driving vehicle. An external agent 118 can include objects such as other vehicles, pedestrians, cyclists, animals, stationary objects etc. The vehicle 102 includes various environmental sensors 104 for detecting the states or parameters of the external agents 118 such as their range, velocity, acceleration, angular location, etc. Exemplary environmental sensors 104 can include, but are not limited to, radar, Lidar, cameras, etc. For illustrative purposes only, the external agent 118 is a vehicle and the environment sensor 104 is a radar system that detects an external agent 118 by transmitting an electromagnetic pulse 114 away from the vehicle 102 and receiving a reflection 116 of the electromagnetic pulse 114 from the external agent 118, thereby determining parameters of the external agent 118 such as its relative velocity, range azimuthal location, etc.

The vehicle 102 further includes one or more internal state sensors 106 for measuring parameters concerning the internal operations of the vehicle 102. For example, an internal state sensor 106 may include a brake sensor, acceleration sensor, a steering wheel sensor, or other sensor that measures a parameter of motion of the vehicle 102, such as propulsion, braking, steering, etc. The measurements of the internal state sensor 106 can be used to determine a current state of the vehicle 102.

The vehicle 102 further includes various actuation devices 108 for operation of the vehicle 102. Exemplary actuation devices 108 can include, but are not limited to, braking actuators, propulsion or throttle actuators, steering actuators, etc. These actuation devices 108 cause the vehicle 102 to speed up, slow down, steer, stop, change gears, change direction, etc. Measurements from the internal state sensors 106 along with the operation of the actuation devices 108 can be used to enable autonomous driving of the vehicle 102. Vehicle 102 further includes a communication module 110 that provides a communication link 115 to a remote location or remote processor 120 in order to transmit and receive data. In one embodiment, the remote processor 120 can provide a route plan for the vehicle 102 to navigate, generally upon request from processor 112.

The vehicle 102 further includes a processor 112 that performs the method of vehicle navigation disclosed herein. The processor 112 receives a route and determines a method of navigating the route using a Markov Decision Process, as discussed herein. The processor 112 receives parameters indicative of the external agents 118 from the environmental sensors 104 and internal parameters of the vehicle 102 from the internal states sensors 106. The processor 112 determines from these parameters a policy or progression of states of the vehicle 102 that enables the autonomous vehicle 102 to navigate the route. In one embodiment, processor 112 navigates the vehicle 102 based on the route plan, measurements regarding the environment of the vehicle 102 and its external agents 118 and measurements regarding the internal state of the vehicle 102. The processor 112 then controls the actuation devices 108 of the vehicle 102 in order to provide one or more actions at the vehicle 102 to move the vehicle 102 through the progression of states at the vehicle 102, thereby operating the vehicle 102. In various embodiments, the processor 112 recalculates the progression of states on a periodic basis.

Figure 2:
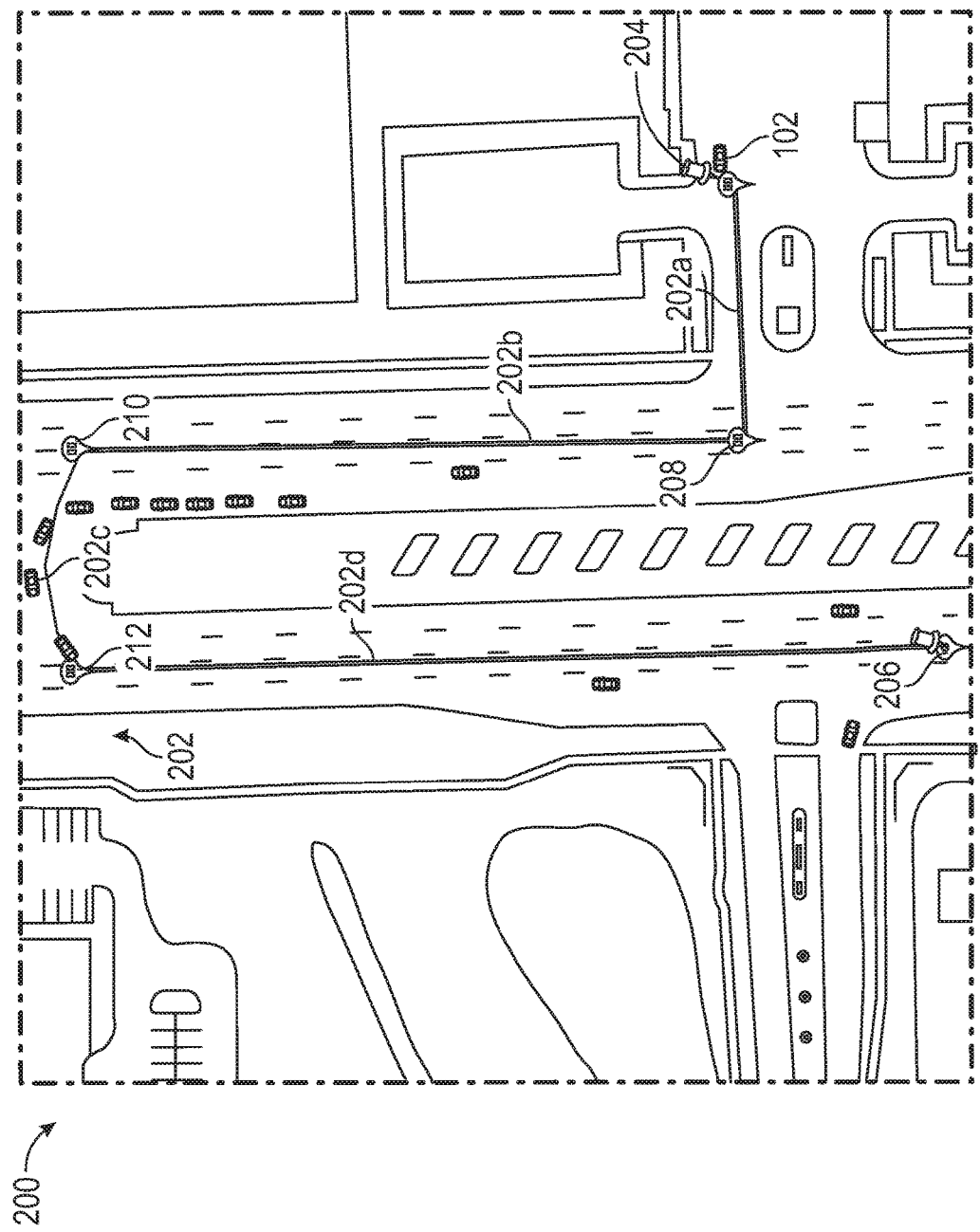
FIG. 2 shows a plan view of a region that includes an illustrative route for a vehicle.

FIG. 2 shows a plan view 200 of a region that includes an illustrative route 202 for a vehicle 102. The illustrative route 202 includes a starting point 204 and a destination 206. The route 202 is generally not a straight line connecting starting point 204 and destination 206. Instead, the route 202 can include various contiguous tracks defined along existing roads and paths of the region. For example, illustrative route 202 includes intermediate points 208, 210 and 212. A first track 202a connects the starting point 204 with first intermediate point 208. A second track 202b connects first intermediate point 208 with second intermediate point 210. A third track 202c connects second intermediate point 210 with third intermediate point 212. A fourth track 202d connects third intermediate point 212 with destination 206. For the most part, tracks 202a-d are linear paths. However, this is not a necessary condition of the tracks 202a-d. In addition, a track can be parsed into sub-tracks until an acceptable approximation to linear paths is achieved.

Figure 3:
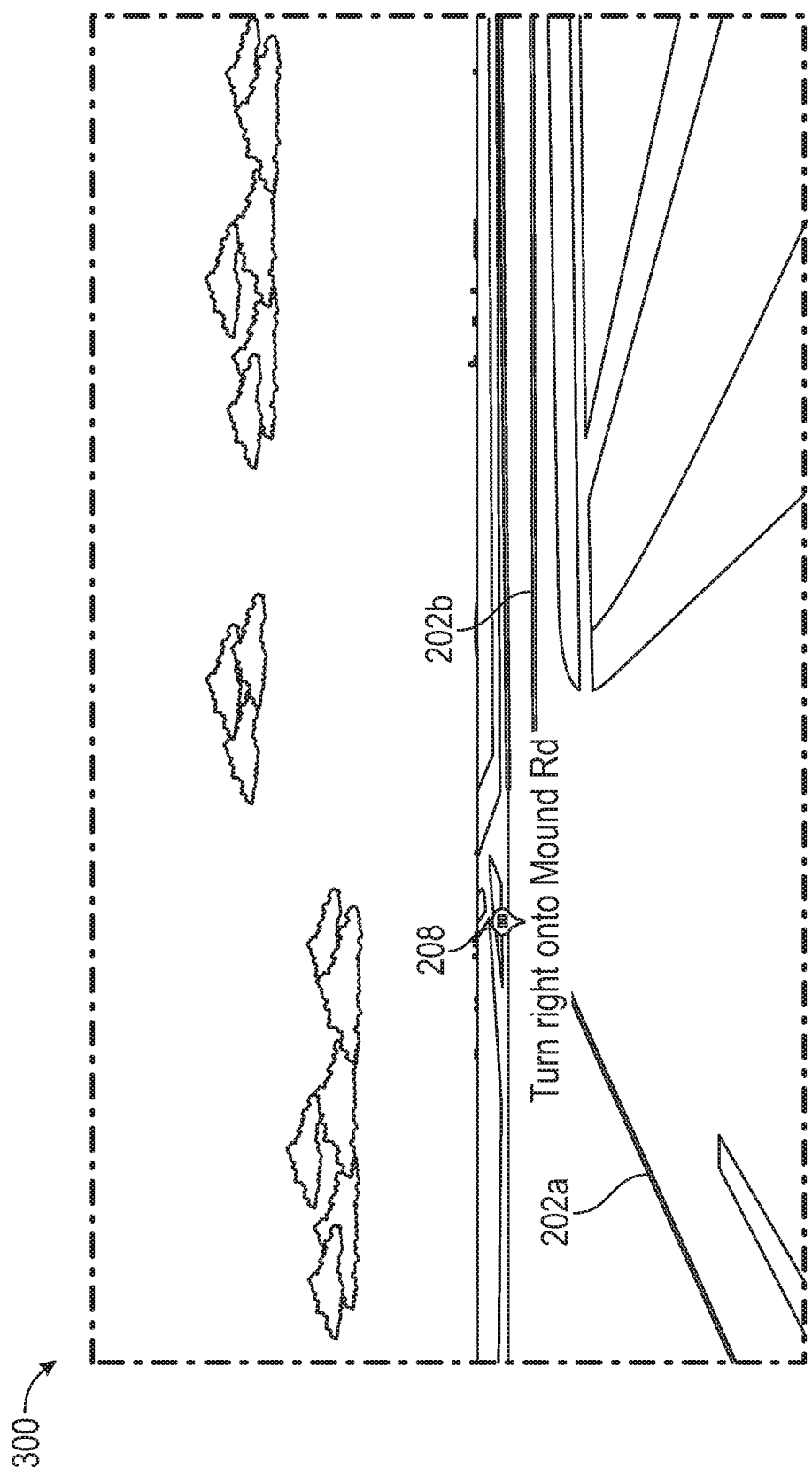
FIG. 3 shows first-person view of a selected portion of the illustrative route.

FIG. 3 shows a first-person view 300 of a selected portion of the illustrative route 202. The first-person view 300 refers to the view as seen by either the vehicle 102 or the driver of the vehicle. The first person view 300 shows the first track 202a, first intermediate point 208 and second track 202b.

Figure 4:
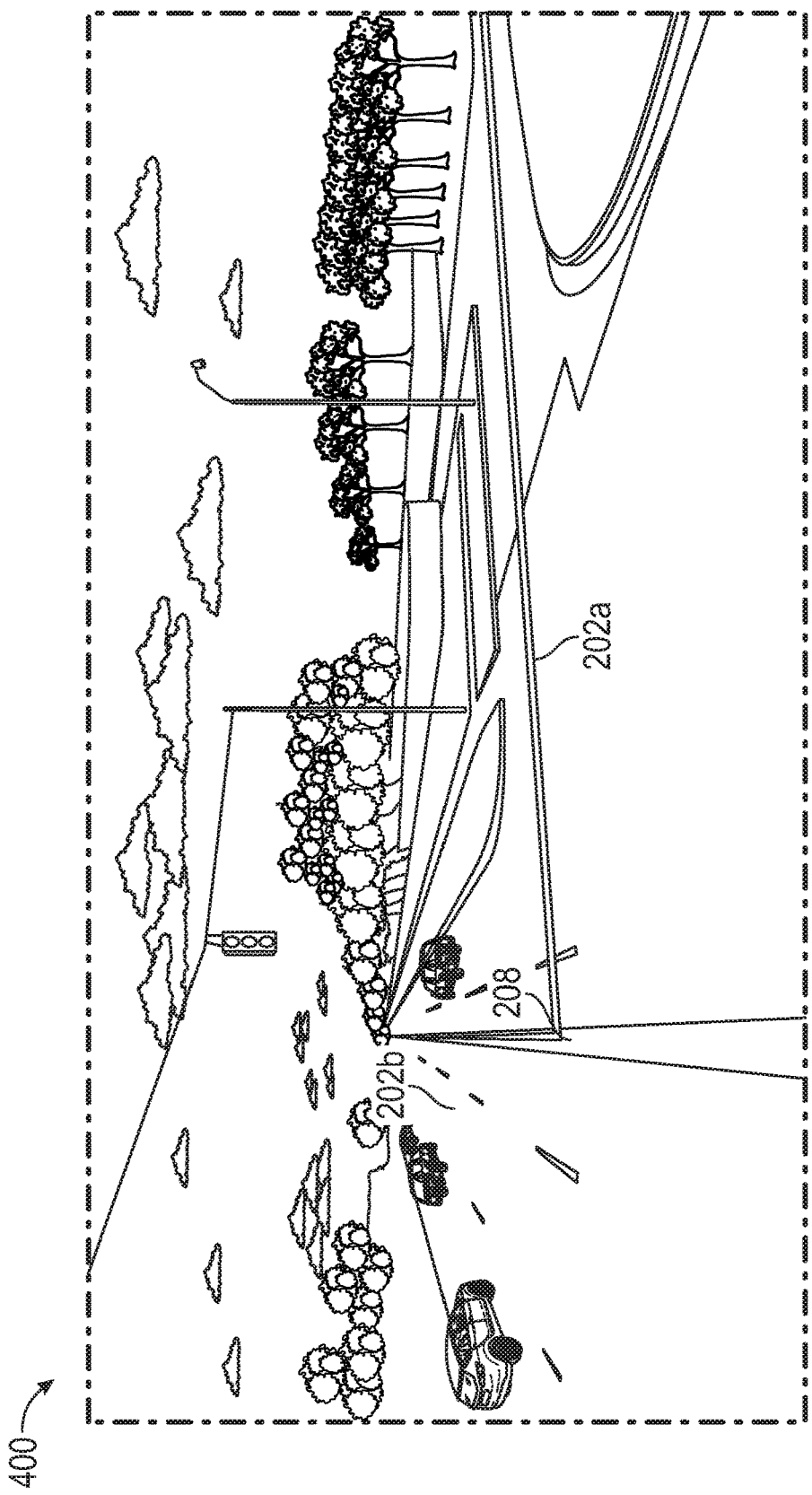
FIG. 4 shows a third-person view of the selected portion of the illustrative route shown in FIG. 3.

FIG. 4 shows a third-person view 400 of the selected portion of the illustrative route 202 shown in FIG. 3. The third-person view 400 shows the first track 202a, first intermediate point 208 and second track 202b. As can be see, the second track 202b includes a plurality of traffic lanes.

Figure 5:
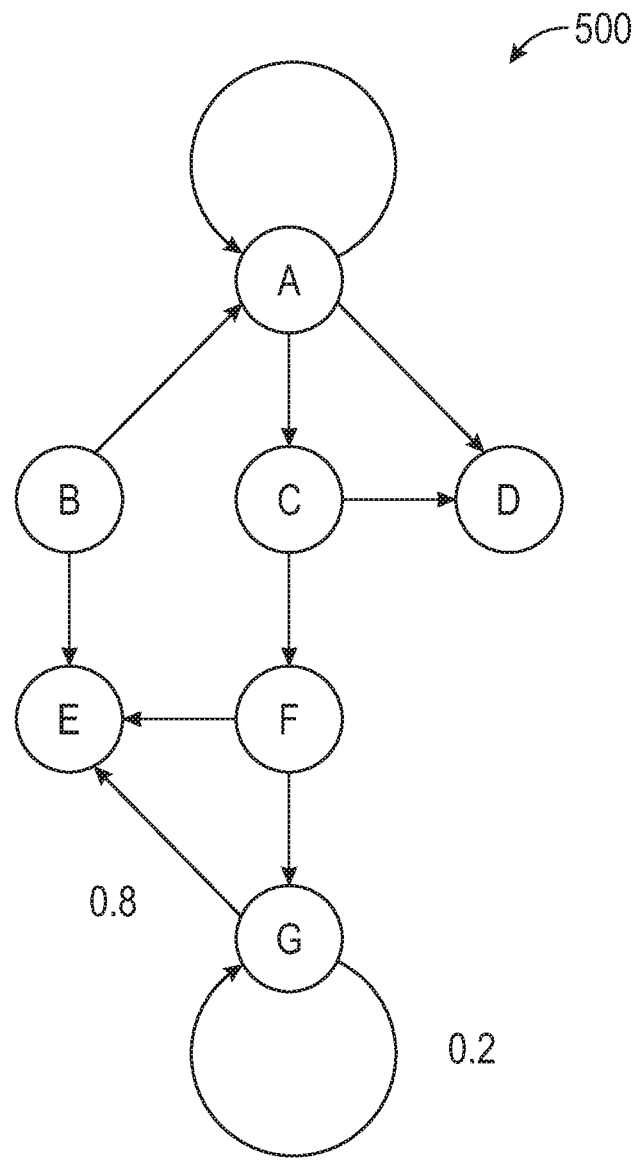
FIG. 5 shows a representation of vehicle states and actions for moving between states, known as a Markov state model.

FIG. 5 shows a representation 500 of vehicle states and actions for moving between states, known as a Markov state model. Circles represent states of the vehicle. A state of the vehicle includes, for example a pose vector of the vehicle indicating a location, orientation, etc. of the vehicle, a kinematics vector of the vehicle indicating a speed, acceleration or gear of the vehicle, an angle of a steering actuator, a throttle level of the vehicle, a braking level of the vehicle and any other parameters that may indicate the current location, motion and/or direction of the vehicle. The state of the vehicle may further include information specific to the environment of the vehicle, such as the proximity of the vehicle to traffic signs, road markings, a location and velocity of external agents, etc. Actions are shown by arrows and take the vehicle from one state to another state. Such actions may include, but are not limited to, accelerating, braking and steering. For example, if the vehicle is in a particular state, such as idling, an action for acceleration can be performed on the vehicle in order to change the state of the vehicle from idling to moving forward at a selected speed.

In one embodiment, the processor 112 of the vehicle 102 determines a progression of states that is suitable for navigating the vehicle 102 through the route 202. Once the route has been received, the processor 112 parses the route into a plurality of tracks. The processor 112 creates a policy or progression of states and overlays an expected progression of the vehicle 102 corresponding to the policy over the route or track. A Markov Decision Process determines an expected reward value of the policy that indicates the effectiveness of the policy in advancing the vehicle 102 towards its destination 206. In one embodiment, the processor 112 creates a plurality of policies and determines expected reward values for each of the plurality of policies. The processor 112 then selects a policy having an optimal reward value and implements the policy at the vehicle 102 to navigate the vehicle 102 along the route 202.

Figure 6:
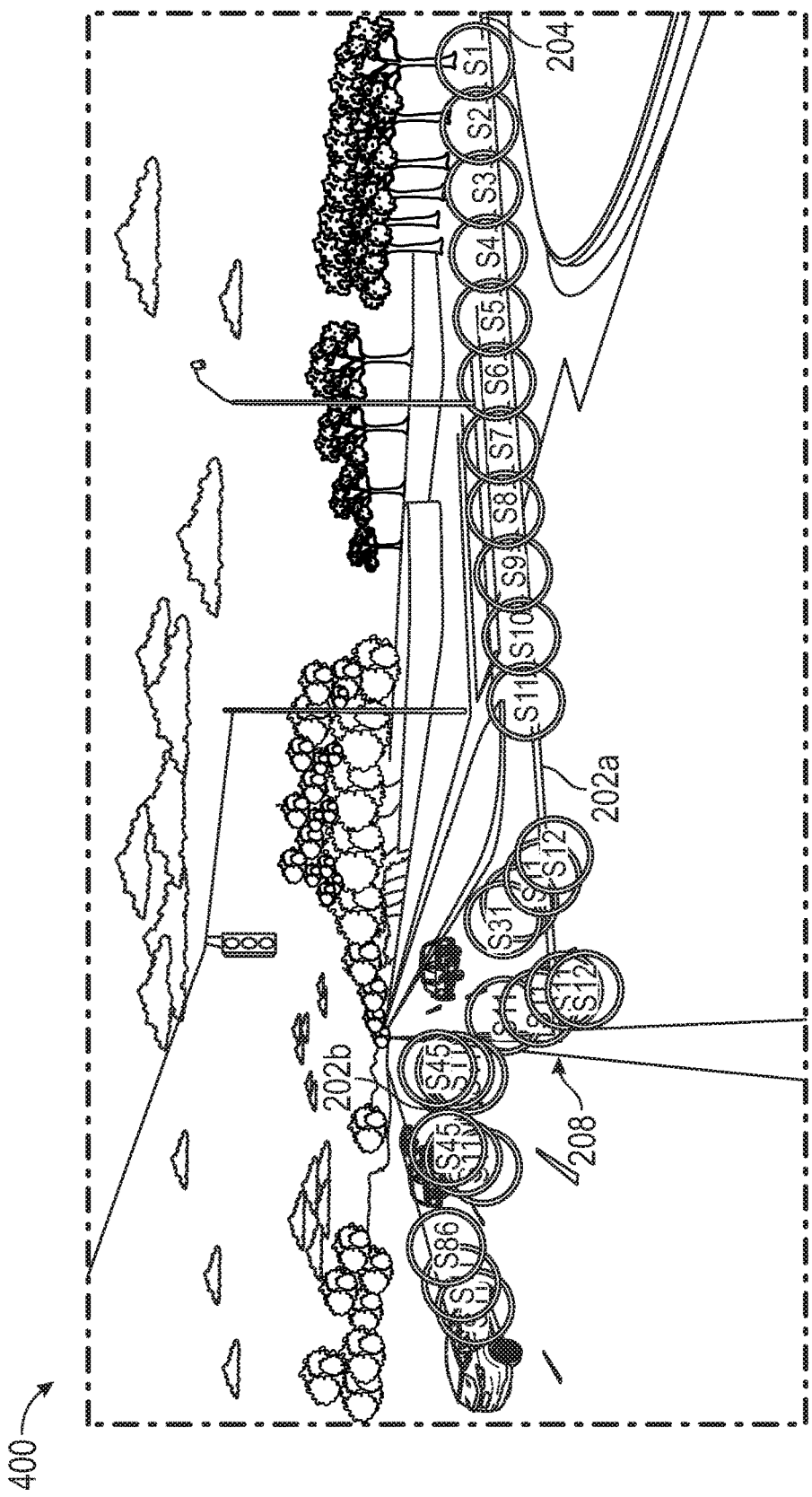
FIG. 6 shows a third-person view including a plurality of vehicles states superimposed on the third-person view of FIG. 4.

FIG. 6 shows a third-person view 600 including a plurality of vehicles states superimposed on the third-person view 400 of FIG. 4. At each state, the vehicle 102 recalculates and selects another policy based on the updated state of the vehicle and taking into account the updated measurements of the activities of external agents within the environment. Referring to FIG. 6, a first set of states S1-S11 are deterministic as the vehicle drives along a straight line 202a and slows to a stop at first intermediate point 208. Once the vehicle enters the intersection, there are many more possible states for the vehicle 102, due to the three lanes of second track 202b as well as the existence of other vehicles.

Since second track 202b is a multi-lane street, there is a need for a decision process as to which lane to select upon turning. Looking ahead to second intermediate point 210, where the vehicle 102 is expected to turn left, there are a plurality of decisions to make regarding when and how to make lane changes in order to get from the right lane (starting from first intermediate point 208) to the left lane by the time the vehicle 102 reaches second intermediate point 210. This decision process takes into account the speeds and locations of other vehicles.

Referring to FIG. 6, the states of the Markov state model of FIG. 5 is overlaid over the third-person view 400 of FIG. 4. The states are represented by circles. Each state is shown at a discrete location of the vehicle 102 along the route. At each of the discrete locations, an updated evaluation of the possible progression of vehicle states can be made. As shown in FIG. 6, states S1-S11 control the state of the vehicle 102 in order to traverse first track 202a from the starting point 204 to the first intermediate point 208. Along first track 202a, there is a singular progression of states for the vehicle 102. However, along second track 202b, there are many possible states. For example, state S11 is shown at various locations along second track 202b. State S12 and state S45 is shown more than once. A Markov Decision Process is the applied to the Markov state model in order to select the particular progression of states that allows the vehicle to traverse this route.

Figure 7:
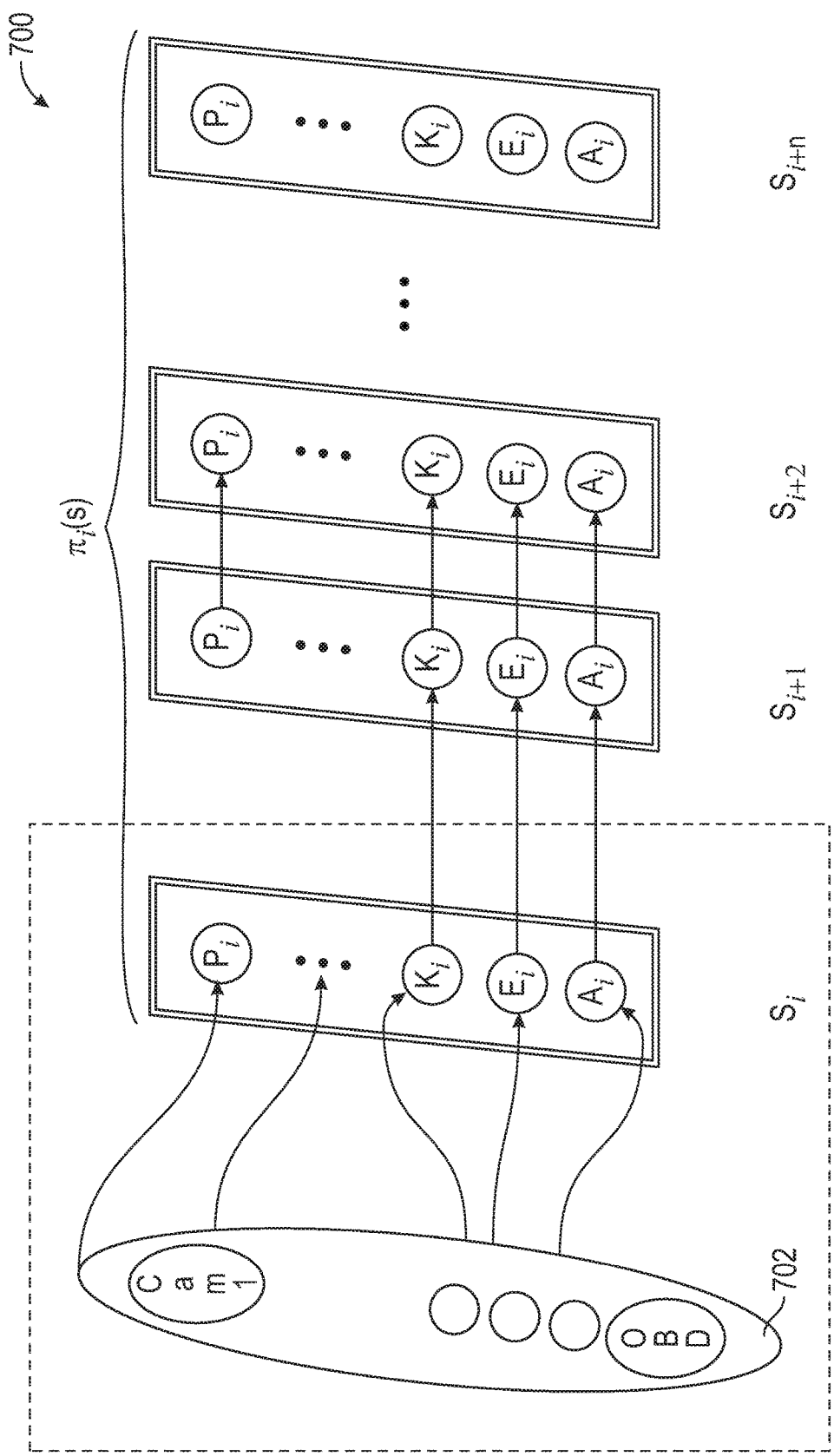
FIG. 7 is a schematic diagram illustrating a policy or progression of states for a vehicle to navigate a route.

FIG. 7 is a schematic diagram 700 illustrating a policy or progression of states for a vehicle 102 to navigate a route 202. The states of the vehicle 102 are indicated by $S_i$, $S_{i+1}$, $S_{i+2}$, ..., $S_{i+n}$, wherein i is an index and n is a number of steps for which the processor wishes to look ahead. The present state of the vehicle 102 is indicated as $S_i$. State $S_i$ is characterized by various vectors, such as a pose matrix $P_i$, a kinematics vector $K_i$, an environmental information vector $E_i$, and an actuator state vector $A_i$. The state $P_i$ is not however limited to these vectors. The pose matrix $P_i$ indicates a location and orientation of the vehicle 102. The kinematics vector $K_i$ provides information about the kinematics of the vehicle 102, such as its speed, acceleration, braking or deceleration, steering, etc. The environmental information vector $E_i$ provides information about external agents 118 in the environment of the vehicle 102, such as the range, orientation, angular direction, speed, acceleration of other vehicles, the state of traffic lights, the presence of pedestrians, cyclists, animals, etc. The actuator state vector $A_i$ provides information regarding the actuating elements of the vehicle 102. Each of the vectors $P_i$, $K_i$, $E_i$, $A_i$ is informed by measurements made by various sensors 702. In one embodiment, pose vector $P_i$ and kinematics vector $K_i$ receive measurements from the internal state sensors 106 (FIG. 1), and environmental information vector $E_i$ receives measurements from the environmental sensors 104. Additionally, the state of the actuating elements can be provided by actuation sensors.

The policy $\pi_i(s)$ prescribes what actions (i.e., behavior control commands) to be taken at a given state $S_i$. Starting at state $S_i$, the vectors $P_i$, $K_i$, $E_i$, $A_i$ are used to calculate a next state $S_{i+1}$ of the vehicle 102. Similarly, state $S_{i+2}$ is calculated from the predicted state $S_{i+1}$. This process continues until an $n^{th}$ state $S_{i+n}$ has been calculated. The process can be repeated a plurality of times to calculate a plurality of policies. With each policy $\pi_i(s)$, an expected reward value can be calculated for the policy. The Markov Decision Process is used to determine a value for the policy. The value represents a long-term discounted future reward achieved by starting from the first state $S_i$ and executing the policy $\pi_i(s)$. In general, the desirability of the policy has to do with how effective the policy is in advancing the vehicle 102 towards its destination. A value function provided by the Markov Decision Process represents a mapping from states to values, where the values represent a cumulative return (i.e., discounted future rewards) obtained by following policy $\pi_i(s)$ to proceed from the current state to the destination state or, alternatively, proceed from the current state forward a preselected number "n" of steps. In one embodiment, the processor can select and implement the policy that has a highest reward (i.e., best advances the vehicle 102 towards its destination) without incurring any penalties (such as having a collision, violating traffic laws, reckless driving, rough rides, jerks, etc.). Once the vehicle moves to a next state (e.g., state $S_{i+1}$), the process can be repeated to determine a suitable policy given the next state of the vehicle.

Figure 8:
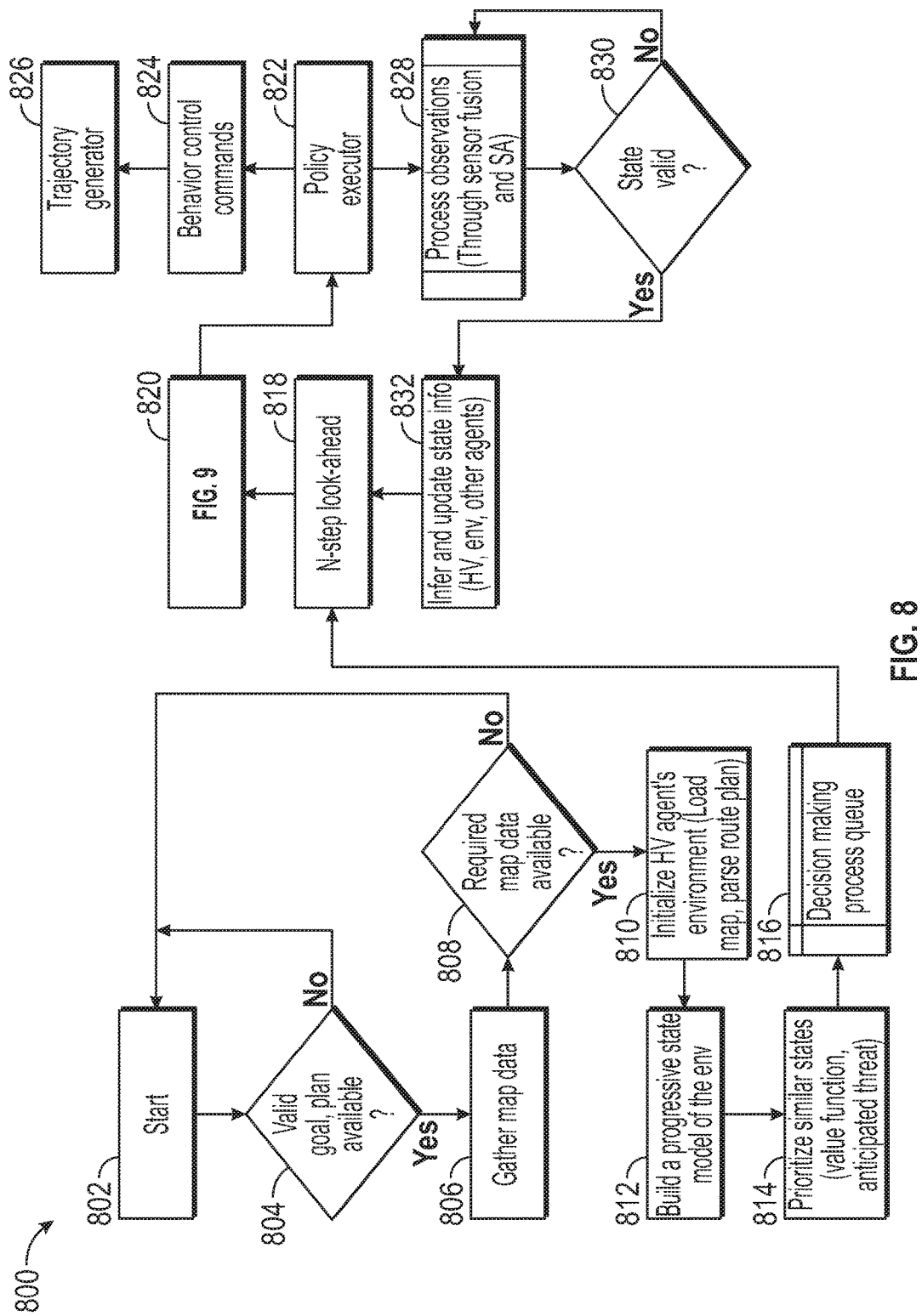
FIG. 8 shows a flowchart for selecting a policy for navigating a route in one embodiment.

FIG. 8 shows a flowchart 800 for selecting a policy for navigating a route in one embodiment. The flowchart 800 starts at box 802. At box 804, processor determines whether a valid driving plan or goal has been entered. If "No", the flowchart 800 returns to box 802. If "Yes", the flowchart 800 proceeds to box 806. In box 806, the processor gathers map data. In box 808, the processor determines whether map data is available for the driving plan for example from a remote processor. If map data is not available at the remote processor, a different remote processor can be queried for map data. If no map data can be found within a specified time period, the flowchart 800 can time out and return to box 802. However, if map data can be located, then at box 810, the map data is downloaded to the vehicle and into the processor. The processor initializes the vehicles environment by parsing the route plane for the map data. In box 812, the processor builds a Markov state model representing the environment. In box 814, the processor prioritizes similar states of the Markov state model, noting value functions of the states and anticipated threats.

In box 816, the processor begins a Markov Decision Process for navigating the route. In box 818, the processor executes a policy iterator that performs steps to select a policy for execution at the autonomous vehicle. The policy iterator (box 818) evaluates various policies by determining an expected cumulative discounted future reward value that is obtained by taking the action or actions prescribed by a policy $\pi_t(s)$ from the current state of the vehicle. The policy iterator also searches for another policy within a policy space having a higher suitable reward value. In one embodiment, the policy iterator 818 searches a database (box 820) of primitive sub-policies that are composed of pre-determined actuation command for moving between a few states although not for moving between all of the states in the planned route. The policy iterator 818 then creates an updated policy using the pre-determined actuation commands/primitive sub-policies and determines an expected reward value for the updated policy.

Figure 9:
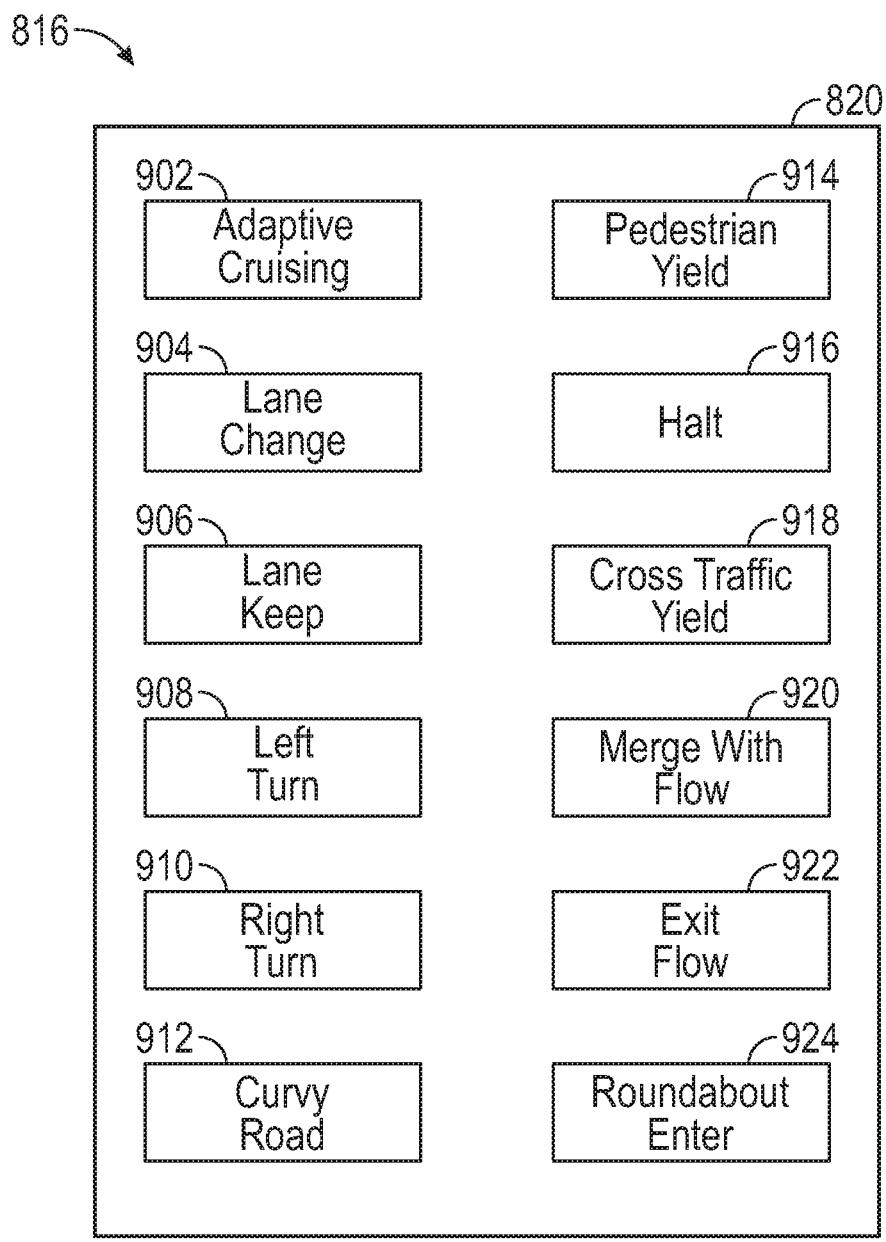
FIG. 9 shows an illustrative database of actions that can be taken at the vehicle.

FIG. 9 shows details of the database 820 of pre-determined actuation commands and/or primitive sub-policies that can be taken at the vehicle in an illustrative embodiment. The pre-determined actuation commands and/or primitive sub-policies of database 816 can include, but are not limited to, adaptive cruising 902, lane changing 904, remaining in the lane 906, left turn 908, right turn 910, curvy road 912, pedestrian yield 914, halt, 916, cross-traffic yield 918, merge with flow 920, exit flow 922 and roundabout enter 924. The policy iterator 818 can create a policy by combining one or more of these pre-determined actuation commands/primitive sub-policies from the database in an ordered progression and performs iterations to find an optimal policy.

Returning to box 818 of FIG. 8, the policy iterator 818 searches a policy space for an optimal policy that can be executed from the current state of the vehicle to get the vehicle to its destination. Alternatively, a policy can be selected that moves the vehicle through a selected number "n" of steps. The policy iterator 818 creates a first policy and determines a first expected reward value for the first policy. The policy iterator 818 can then build a second policy and determine a second expected reward value for the second policy and then selects, from the first policy and the second policy, the policy having the greater expected reward value. This process can be repeated for a selected number of iterations or until a selected expected reward value is reached. In one embodiment, the policy iterator 818 selects the policy having an optimal or maximal reward that does not incur any penalties, such as collision, traffic violations, etc.

Once a policy has been selected by the policy iterator 818, the process flows to a policy executor of box 822. The policy executor 822 determines actions to take at various actuation devices 108 of the vehicle and sends the actions to the actuation devices in box 824 in order to having the policy executed at the vehicle. Executing the policy at box 824 results in generating a trajectory for the vehicle at box 826. Also, in box 828 the selected policy is fused with observations from the external environment (i.e., measurements from environmental sensors) in order to determine a next state resulting from implementing the policy at the vehicle in its current state. In box 830, the processor determines whether the next state is a valid state. If "No" the processor returns to box 828 in order to fuse the policy with current observations. If "Yes" (i.e., the state is valid), then in box 832 the processor updates the state of the vehicle to the next state, including the internal state parameters of the vehicle and the parameters of the environment and external agents.

From the updated state of box 832, the flowchart returns to the policy iterator box 818, where the processor can proceed to determine an updated set of policies for navigating the vehicle based on the updated state.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the disclosure not be limited to the particular embodiments disclosed, but will include all embodiments falling within the scope of the application.

What is claimed is:

1. A method of operating an autonomous vehicle, comprising:
   obtaining a route having a destination at the autonomous vehicle;
   building a Markov state model representing a plurality of states for the autonomous vehicle;
   generating a plurality of driving policies for navigating the route from the Markov state model, wherein each driving policy includes a progression through the plurality of states, wherein generating a driving policy includes combining a plurality of sub-policies from a database in an ordered progression;
   selecting a policy for navigating the route from the plurality of driving policies using a Markov Decision Process; and
   executing the selected policy at the autonomous vehicle to navigate the vehicle along the route towards the destination.

2. The method of claim 1, further comprising updating a state of the vehicle as the vehicle navigates the route and determining an updated policy based on the updated state of the vehicle.

3. The method of claim 1, wherein executing the selected policy at the autonomous vehicle further comprises performing an action at the vehicle to advance the vehicle towards a destination of the route according to the policy.

4. The method of claim 1, further comprising:
   determining an expected reward value for each of the plurality of driving policies, wherein the reward value of a driving policy indicates an effectiveness of the driving policy in advancing the autonomous vehicle towards the destination; and
   selecting the policy having a selected reward value.

5. The method of claim 4, wherein the selected policy further comprises the policy having a greatest expected reward value with no penalties.

6. The method of claim 1, wherein a state of the vehicle includes at least one of a pose vector, a kinematics vector, environmental information vector, and an actuator state of the autonomous vehicle.

7. The method of claim 6, wherein the environmental information vector includes parameters of external agents and traffic regulation devices in the environment.

8. A system for operating an autonomous vehicle, comprising:
   an environmental sensor configured to obtain one or more parameters of external agents of the vehicle;
   a database of pre-determined sub-policies; and
   a processor configured to:
     obtain a route having a destination at the autonomous vehicle;

build a Markov state model representing a plurality of states for the autonomous vehicle and the one or more parameters of the external agents;

generate a plurality of driving policies for navigating the route from the Markov state model, wherein each driving policy includes a progression through the plurality of states, wherein generating a driving policy includes combining a plurality of sub-policies from the database in an ordered progression;

select a policy for navigating the route from the plurality of driving policies using a Markov Decision Process; and execute the selected policy at the autonomous vehicle to navigate the vehicle along the route towards the destination.

9. The system of claim 8, wherein the processor is further configured to update a state of the vehicle as the vehicle navigates the route and determine an updated policy based on the updated state of the vehicle.

10. The system of claim 8, wherein the processor is further configured to execute the selected policy at the autonomous vehicle by performing an action at the vehicle to advance the autonomous vehicle towards the destination.

11. The system of claim 8, wherein the processor is further configured to:

determine an expected reward value for each of the plurality of driving policies, wherein the reward value of a driving policy indicates an effectiveness of the driving policy in advancing the autonomous vehicle towards the destination; and select the policy having a selected reward value.

12. The system of claim 11, wherein the selected policy further comprises the policy having a greatest expected reward value with no penalties.

13. The system of claim 8, wherein a state of the vehicle includes at least one of a pose vector, a kinematics vector, environmental information vector, and an actuator state of the autonomous vehicle.

14. The system of claim 13, wherein the environmental information vector includes parameters of external agents and traffic regulation devices in the environment.

15. An autonomous vehicle, comprising:

an environmental sensor configured to obtain one or more parameters of external agents of the vehicle;

a database of pre-determined sub-policies; and a processor configured to:

obtain a route having a destination at the autonomous vehicle;

build a Markov state model representing a plurality of states for the autonomous vehicle and the one or more parameters of the external agents;

generate a plurality of driving policies for navigating the route from the Markov state model, wherein each driving policy includes a progression through the plurality of states, wherein generating a driving policy includes combining a plurality of sub-policies from the database in an ordered progression;

select a policy for navigating the route from the plurality of driving policies using a Markov Decision Process; and execute the selected policy at the autonomous vehicle to navigate the vehicle along the route towards the destination.

16. The autonomous vehicle of claim 15, wherein the processor is further configured to update a state of the vehicle as the vehicle navigates the route and determine an updated policy based on the updated state of the vehicle.

17. The autonomous vehicle of claim 15, wherein a state of the vehicle includes at least one of a pose vector, a kinematics vector, environmental information vector, and an actuator state of the autonomous vehicle.

18. The autonomous vehicle of claim 15, wherein the environmental information vector includes parameters of external agents and traffic regulation devices in the environment.

19. The autonomous vehicle of claim 15, wherein the processor is further configured to:

determine an expected reward value for each of the plurality of driving policies wherein the reward of a driving policy indicates an effectiveness of the driving policy in advancing the autonomous vehicle towards the destination; and select the policy having a selected reward value.

20. The autonomous vehicle of claim 19, wherein the selected policy further comprises the policy having a greatest expected reward with no penalties.

* * * * *